(12) United States Patent
Auvray et al.

(10) Patent No.: US 10,706,990 B2
(45) Date of Patent: Jul. 7, 2020

(54) FIRE-RESISTANT CABLE

(71) Applicant: NEXANS, Courbevoie (FR)

(72) Inventors: Thierry Auvray, Lyons (FR); Franck Gyppaz, Lyons (FR); Corinne Poulard, Orlienas (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 15/781,842

(22) PCT Filed: Nov. 30, 2016

(86) PCT No.: PCT/FR2016/053144
§ 371 (c)(1),
(2) Date: Jun. 6, 2018

(87) PCT Pub. No.: WO2017/098114
PCT Pub. Date: Jun. 15, 2017

(65) Prior Publication Data
US 2018/0374608 A1    Dec. 27, 2018

(30) Foreign Application Priority Data

Dec. 11, 2015   (FR) ...................................... 15 62210

(51) Int. Cl.
| | |
|---|---|
| *H01B 3/00* | (2006.01) |
| *H01B 7/295* | (2006.01) |
| *H01B 3/14* | (2006.01) |
| *C04B 28/00* | (2006.01) |
| *C04B 28/04* | (2006.01) |
| *C04B 28/26* | (2006.01) |
| *C04B 24/38* | (2006.01) |
| *H01B 3/30* | (2006.01) |

(Continued)

(52) U.S. Cl.
CPC ........... *H01B 7/295* (2013.01); *C04B 24/383* (2013.01); *C04B 28/006* (2013.01); *C04B 28/04* (2013.01); *C04B 28/26* (2013.01); *H01B 3/006* (2013.01); *H01B 3/14* (2013.01); *H01B 3/30* (2013.01); *H01B 7/0275* (2013.01); *H01B 7/18* (2013.01); *H01B 13/145* (2013.01); *H01B 13/148* (2013.01); *C04B 2103/30* (2013.01); *C04B 2111/00482* (2013.01); *C04B 2111/00844* (2013.01); *C04B 2111/28* (2013.01); *C04B 2111/92* (2013.01); *Y02P 40/165* (2015.11)

(58) Field of Classification Search
CPC ....................................................... H01B 3/00
See application file for complete search history.

(56) References Cited

U.S. PATENT DOCUMENTS

| | | | | |
|---|---|---|---|---|
| 4,509,985 A | * | 4/1985 | Davidovits | ............. C04B 14/04 106/624 |
| 9,321,912 B2 | * | 4/2016 | Tai | ......................... H01B 7/295 |

FOREIGN PATENT DOCUMENTS

| | | |
|---|---|---|
| CH | 352717 | 3/1961 |
| DE | 2105096 | 8/1978 |

(Continued)

OTHER PUBLICATIONS

International Search Report dated Jan. 26, 2017.

*Primary Examiner* — Chau N Nguyen
(74) *Attorney, Agent, or Firm* — Sofer & Haroun, LLP

(57) ABSTRACT

The present invention relates to a fire-resistant cable comprising at least one electrically insulating composite layer based on at least one cementitious material and at least one starch, and the process for manufacturing same.

16 Claims, 1 Drawing Sheet

(51) Int. Cl.
    *H01B 7/02*           (2006.01)
    *H01B 7/18*           (2006.01)
    *H01B 13/14*          (2006.01)
    *C04B 111/00*        (2006.01)
    *C04B 111/28*        (2006.01)
    *C04B 103/30*        (2006.01)
    *C04B 111/92*        (2006.01)

(56) References Cited

FOREIGN PATENT DOCUMENTS

| | | |
|---|---:|---|
| GB | 569960 | 6/1945 |
| GB | 2088400 | 6/1982 |
| JP | 2014106162 | 6/2014 |
| KR | 102012013241 | 12/2012 |

\* cited by examiner

FIRE-RESISTANT CABLE

RELATED APPLICATION

This application is a National Phase of PCT/FR2016/053144, filed on Nov. 30, 2016, which in turn claims the benefit of priority from French Patent application No. 15 62210, filed on Dec. 11, 2015 the entirety of which are incorporated by reference.

FIELD OF THE INVENTION

The present invention relates to a fire-resistant electric and/or optical cable comprising at least one electrically insulating composite layer based on at least one cementitious material and at least one starch, and the process for manufacturing same.

It applies typically, but not exclusively, to electric and/or optical cables, intended for the transmission of power and/or the transmission of data, in particular to fire-resistant electric and/or optical safety cables, especially halogen-free, able to function for a given period of time in fire conditions, without propagating the fire or generating large amounts of smoke. These safety cables are in particular medium-voltage power transmission cables (especially from 6 to 45-60 kV) or low-frequency transmission cables, such as control cables or signalling cables.

DESCRIPTION OF THE RELATED ART

A power and/or telecommunications cable is a cable intended for the transmission of electrical energy and/or for data transmission. Conventionally it comprises one or more insulated conductive elements, or in other words one or more elongated (electrical and/or optical) conductor(s) surrounded by at least one electrically insulating layer. The electrically insulating layer may typically be an electrically insulating polymer layer in physical contact with the electrical and/or optical conductor(s). Said insulated conductive element(s) are surrounded by an outer protective sheath intended to provide mechanical protection of the insulated conductive element(s). In certain cable designs, there is only a single layer that provides the two functions of electrical insulation and protective sheath.

The materials generally used to form the electrically insulating layer and/or said protective sheath are composite materials based on polymers, for example on silicone polymers, and on various additives, especially reinforcing fillers such as silica, and fireproofing (or flame-retardant) fillers intended to improve their fire resistance.

WO 2011/000692 A1 describes in particular a polymer composition having flame-retardant properties comprising a copolyester elastomer, from 0 to 30% by weight of one or more other polymers, from 1 to 15% by weight of a flame retardant containing a halogen (e.g. 1,2-bis(pentabromophenyl) ethane), and from 0 to 15% by weight of a halogen-free flame retardant (e.g. $Sb_2O_3$). The composition may also comprise a filler such as corn starch powder. The polymer composition may be used as a protective layer in an electric cable.

Despite the presence of such fillers, the fire resistance of these electrically insulating layers is not always entirely satisfactory.

In order to make a cable fire-resistant, it has also been proposed, especially in patent application EP 2 760 030 A1, to cover said cable with an electrically insulating layer comprising several superposed insulating tapes comprising mica and glass fibres, and a polymer binder (e.g. polyorganosiloxane) in contact with each of said insulating tapes. However, the cost of producing said electrically insulating layer is high (e.g. very long preparation time), and said layer is very bulky.

Other materials such as stone, brick, cement, lead, steel, concrete, rock wool, ceramics, geopolymers, etc., have fire resistance properties.

Cement is a pulverulent mineral material that forms a cement binder paste with water or with a saline solution, which paste is capable of agglomerating various substances as it hardens. Hardening takes place by simple hydration of calcium aluminates and calcium silicates and the cement binder paste retains its strength and stability after hardening. This cement binder paste is also referred to as cementitious material. Cements are classified according to standard EN-197-1-2000 into five main families: Portland cement (CEM I), Portland composite cement (CEM II), blast-furnace cement (CEM III), pozzolanic cement (CEM IV) and composite cement or slag and fly ash cement (CEM V). White cement is a Portland cement without metal oxide. Artificial cement is generally obtained by calcining mixtures of silica, alumina, carbonate of lime, and optionally metal oxides such as iron oxide.

Geopolymers are considered to be alternative binders that can replace the aforementioned cementitious materials. Geopolymers are essentially mineral chemical compounds or mixtures of compounds consisting of units of silico-oxide (—Si—O—Si—O—), silico-aluminate (—Si—O—Al—O—), ferro-silico-aluminate (—Fe—O—Si—O—Al—O—) or alumino-phosphate (—Al—O—P—O—) type, created through a process of geopolymerization (i.e. polycondensation). Geopolymers may be used alone or as a mixture with organic polymers, mineral, metallic or organic fibres (e.g. glass fibres, ceramic fibres, etc.), carbon, graphite, etc. depending on the type of application desired. Geopolymers are generally capable of polymerizing and hardening at ambient temperature (geopolymer cements). It is also possible to accelerate the rate of polymerization and hence the hardening of geopolymers by subjecting them to a heat treatment.

The most common geopolymers are those based on aluminosilicates denoted by the term "poly(sialate)" [or "poly(silico-oxo-aluminate)" or (—Si—O—Al—O—)$_n$ with n denoting the degree of polymerization]. These aluminosilicate geopolymers result from the polycondensation of oligomers of oligo(sialate) type formed from a mixture of at least one aluminosilicate, of an alkali metal reactant (e.g. sodium or potassium silicate) and of water. Aluminosilicate-based geopolymers have been grouped into three families as a function of the Si/Al atomic ratio, which may be equal to 1, 2 or 3. A distinction is made between the poly(sialates) corresponding to the formula $M_n$(—Si—O—Al—O—)$_n$ or (M)-PS, the poly(sialate-siloxos) corresponding to the formula $M_n$(—Si—O—Al—O—Si—O—)$_n$ or (M)-PPS, and the poly(sialate-disiloxos) corresponding to the formula $M_n$(—Si—O—Al—O—Si—O—Si—O)$_n$ or (M)-PSDS, with M representing at least one alkali or alkaline-earth metal cation such as K, Na, Li, Cs or Ca and n denoting the degree of polymerization.

Geopolymer cements are used in numerous applications: design of novel materials in the civil engineering and construction fields, creation of sculptures, manufacture of fire-retardant partitions and doors for protection against fires, and very recently as a structure of the "black box" on board aircraft.

By way of example, patent application U.S. Pat. No. 6,831,118 describes a flexible fire protection panel made of composite foam comprising a matrix made of plastic material (e.g. flexible elastic polyurethane) and an inorganic filler material (e.g. geopolymer grains). The panel may be used for the fire protection of openings in walls, and also of conduits for cables. It is especially prepared by plastic injection moulding or hot molding of a composition comprising precursors of the matrix made of plastic material (e.g. polyol and polyisocyanate), an inorganic filler material (e.g. perlite) and a foaming agent (aluminium powder).

However, the solutions described above are not suitable, especially in terms of flexibility, adhesion and heat protection, to be able to serve as electrically insulating fire-resistant layer in an electric and/or data transmission cable, especially during a fire. Moreover, they are not necessarily compatible with retaining good mechanical and dielectric properties of the other constituents of a power and/or data transmission cable (electric and/or optical conductive element, other electrically insulating layers, screens, etc.).

OBJECTS AND SUMMARY

The aim of the present invention is to overcome the drawbacks of the techniques of the prior art by proposing a power and/or telecommunications cable having good fire resistance, while guaranteeing good mechanical properties, especially in terms of flexibility, and an advantageous cost price.

Another aim of the invention is to provide a process for manufacturing a fire-resistant cable that is simple, economical, easy to carry out and that makes it possible to achieve a cable which prevents flame propagation, resists fire in order to operate for as long as possible, and limits degradation thereof in extreme heat conditions such as a fire, while guaranteeing good mechanical properties, especially in terms of flexibility.

The first subject of the present invention is a power and/or telecommunications cable comprising at least one elongated conductive element and at least one electrically insulating composite layer surrounding said elongated conductive element, characterized in that the electrically insulating composite layer comprises at least one starch, at least one plasticizer for starch and at least one cementitious material.

By virtue of the presence of the electrically insulating composite layer, the cable of the invention has good fire resistance while having good mechanical properties. In particular, the electrically insulating composite layer is sufficiently flexible to enable manipulation of the cable (e.g. rolling up, folding, twisting) without leading to any prohibitive adverse effects on said layer which would have the consequence of reducing the cohesion and fire resistance thereof. Moreover, the electrically insulating composite layer remains intact from ambient temperature to the charged operating temperature of the cable (i.e. at a voltage) and has the advantage of forming a porous structure when this layer is exposed to temperatures greater than or equal to 1000° C. for a duration which may extend up to 120 min, reached especially during a fire. This porous and rigid structure contains air which, by its nature, is an excellent thermal insulator.

The electrically insulating composite layer of the cable of the invention is an organic/inorganic hybrid layer, especially consisting of a single homogeneous organic/inorganic phase.

In the present invention, the expression "cementitious material" means a solid inorganic material obtained without a sintering step and obtained from at least one step of hardening or setting, especially by hydration or by polycondensation.

Consequently, the cementitious material of the invention is different from a ceramic. Indeed, a ceramic is distinguished from a cementitious material in that it is obtained from at least one sintering step (densification of a powder under the effect of heat).

The cementitious material of the invention preferably comprises:
 silicon (Si),
 aluminium (Al) or magnesium (Mg),
 oxygen (O), and
 at least one element selected from potassium (K), sodium (Na), lithium (Li), caesium (Cs) and calcium (Ca).
Aluminium (Al) is preferred.

According to a particularly preferred embodiment of the invention, the cementitious material is a geopolymer cement or is derived (i.e. is obtained) from a mixture consisting of a conventional anhydrous cement and water or a mixture consisting of a magnesium silicate, an alkali metal silicate, an alkaline base and water.

Advantageously, the cable in accordance with the invention complies with at least any one of the following fire resistance standards: EN50200, IEC60331-1, EN50399, IEC60331-11, IEC60331-21, IEC60331-23, IEC60331-25, DIN4102, NBN713020 addendum 3, EN50577, NFC32070 CR1, IEC600332-1 and BS6387CWZ.

Advantageously, the electrically insulating composite layer defined above complies with the fire resistance standard IEC 60331-11, with electrical cables at a voltage of 10 kV exposed to a temperature of 750° C. approximately for 120 minutes.

The composite layer of the invention is transformed under the effect of a high temperature, especially a temperature greater than 1000° C., generally reached during a fire, to form a cohesive and porous residual layer which protects the cable and especially the underlying layers and/or the elongated conductive element.

The electrically insulating composite layer preferably has a substantially constant thickness and especially constitutes a continuous protective envelope.

The electrically insulating composite layer preferably has a thickness approximately ranging from 0.5 to 5 mm, and more preferably approximately ranging from 0.8 to 3 mm.

When the thickness of the electrically insulating composite layer is less than 0.5 mm, the fire resistance of said layer is not ensured and the heat protection of the cable of the invention is insufficient.

According to a first embodiment of the invention, the cementitious material is derived from a mixture consisting of a conventional anhydrous cement and water. The hardening then originates from dehydration of calcium silicates and calcium aluminates.

The anhydrous cement may be Portland cement and in particular white cement or slag and fly ash cement. The abovementioned cements are well known to those skilled in the art.

According to a second embodiment of the invention, the cementitious material is a geopolymer cement.

In the present invention, the term "geopolymer cement" or "hardening of a geopolymer composition" indicates that the hardening is carried out by an internal reaction of the polycondensation type or of the hydrothermal type, and that it is not the result of simple drying, as is generally the case for binders based on alkali metal silicates.

Indeed, geopolymer cements result from a mineral polycondensation reaction by alkaline activation, referred to as geosynthesis, as opposed to traditional hydraulic binders in which the hardening is the result of a hydration of the calcium aluminates and calcium silicates.

The geopolymer cement may be an aluminosilicate geopolymer cement, especially which may have an Si/Al mole ratio ranging from 1 to 35.

The aluminosilicate geopolymer cement may be selected from poly(sialates) corresponding to the formula (I) $M_n(-Si-O-Al-O-)_n$ [(M)-PS], poly(sialate-siloxos) corresponding to the formula (II) $M_n(-Si-O-Al-O-Si-O-)_n$ [(M)-PPS], and poly(sialate-disiloxos) corresponding to the formula (III) $M_n(-Si-O-Al-O-Si-O-Si-O-)_n$ [(M)-PSDS], in which formulas M represents at least one K, Na, Li, Cs alkali metal cation or a mixture thereof, and n denotes the degree of polymerization. In the compound of formula (I), the Si/Al mole ratio is 1, in the compound of formula (II), the Si/Al mole ratio is 2, and in the compound of formula (III), the Si/Al mole ratio is 3.

The Si/Al mole ratio influences the mechanical properties of the geopolymer cement, in particular its properties of resistance to a mechanical stress. According to a preferred embodiment of the invention, the geopolymer cement is selected from compounds in which the Si/Al mole ratio ranges approximately from 1.9 to 3 and even more preferentially approximately from 1.9 to 2.5. The choice of these geopolymer cements makes it possible to have an electrically insulating fire-resistant composite layer while being flexible enough to enable the cable in accordance with the invention to be manipulated without leading to cracks in said electrically insulating composite layer.

A cementitious material according to the first and second embodiments defined above comprises silicon (Si), aluminium (Al), oxygen (O), and at least one element selected from potassium (K), sodium (Na), lithium (Li), caesium (Cs) and calcium (Ca).

According to a third embodiment of the invention, the cementitious material is derived from a mixture consisting of a magnesium silicate, an alkali metal silicate, an alkaline base and water.

A cementitious material according to the third embodiment defined above comprises silicon (Si), magnesium (Mg), oxygen (O), and at least one element selected from potassium (K), sodium (Na), lithium (Li), caesium (Cs) and calcium (Ca).

The cementitious material is preferably a geopolymer cement.

According to the invention, the cementitious material preferably represents approximately from 10 to 50% by weight, and even more preferentially approximately from 25 to 40% by weight relative to the total weight of said electrically insulating composite layer.

Starch generally comprises amylose, and amylopectin, and optionally phytoglycogen.

By way of example (and depending on the source), starch comprises from 15 to 30% by weight of amylose, approximately from 70 to 85% by weight of amylopectin, and from 0 to 20% by weight of phytoglycogen, relative to the total weight of the starch.

By way of example of starch, mention may be made of a native starch or a modified starch, and preferably a native starch.

The native starch may be a starch from cereals (e.g. wheat, corn, barley, triticale, sorghum or rice), tubers (e.g. potato or cassava), legumes (e.g. pea or soybean), roots, bulbs, stems, fruit or a mixture thereof.

The modified starch may be a starch modified physically, chemically or enzymatically.

The modified starch may be selected from oxidized starches, starches hydrolyzed by acid, oxidizer or enzymatically, starches modified (e.g. functionalized) physico-chemically, such as especially esterified and/or etherified starches.

The functionalization may be obtained by acetylation in aqueous phase with acetic anhydride, reactive extrusion of acid anhydrides, mixed anhydrides, fatty acid chlorides, caprolactone or lactide oligomers, hydroxypropylation in a tacky phase, cationization in a dry phase or tacky phase, by crosslinking, by anionization by phosphation or succinylation, by silylation, by telomerization with butadiene, etc.

Oxidized starches are preferred.

The plasticizer for starch is intended to improve the dispersion of the starch within the composite layer. It may be a metal stearate, a polyethylene glycol, an ethylene glycol, a polyol such as glycerol, sorbitol, mannitol, maltitol, xylitol or an oligomer of one of these polyols, a sucrose such as glucose or fructose, a plasticizer containing amide groups, any type of plasticizer based on modified polysaccharide(s) or a mixture thereof.

The preferred plasticizer is a metal stearate such as zinc stearate.

According to the invention, the starch and the plasticizer for starch (i.e. the combination thereof) preferably represent approximately from 50 to 90% by weight, and even more preferentially approximately from 60 to 75% by weight relative to the total weight of said electrically insulating composite layer.

The plasticizer for starch/starch weight ratio may range approximately from 1/1 to 3/1.

The composite layer may also comprise at least one agent that delays setting at ambient temperature of the composite composition as defined below, and which enables same to remain malleable for longer.

Such a retarder may be selected from ammonium, alkali metals, alkaline-earth metals, borax, lignosulfonates and in particular metal salts of lignosulfonates, cellulose and derivatives thereof such as cellulose acetate or carboxymethyl hydroxyethyl cellulose, sulfoalkylated lignins such as sulfomethylated lignin, hydroxycarboxylic acids, ethylene glycols and derivatives thereof, copolymers of salts of 2-acrylamido-2-methylpropanesulfonic acid and of acrylic acid or of maleic acid, saturated salts, and mixtures thereof.

According to a particularly preferred embodiment of the invention, the retarder is selected from lignosulfonates.

When it is used, the retarder preferably represents approximately from 0.2 to 1% by weight, and even more preferentially approximately from 0.4 to 0.8% by weight relative to the total weight of the composite layer.

The composite layer may also comprise at least one inert filler, especially selected from talc, kaolin, metakaolin and a mixture thereof.

Talc is preferred.

When it is used, the inert filler preferably represents approximately from 0.5 to 5% by weight relative to the total weight of the cementitious material.

The composite layer may also comprise at least one compound that accelerates setting (i.e. hardening) at ambient temperature of the composite composition as defined below.

By way of examples of compounds that accelerate setting, mention may be made of aluminium sulfate, alums (e.g. potassium aluminium double sulfate), calcium chloride, calcium sulfate, hydrated calcium sulfate, sodium aluminate, sodium carbonate, sodium chloride, sodium silicate, sodium sulfate, iron (III) chloride or a mixture thereof.

The composite layer may also comprise at least one dispersant.

As examples of dispersants, that is to say of compounds that make it possible to improve the rheological properties of the composite composition as defined below, mention may be made of a naphthalenesulfonic acid-formaldehyde condensate, an acetone-formaldehyde-sulfite condensate, a melamine sulfonate-formaldehyde condensate, or a mixture thereof.

The electrically insulating composite layer may also comprise at least one organic additive with a polymer structure. This additive is intended to improve the cohesion of the composite layer and its adhesion to the layer of the cable with which it is intended to be in direct physical contact.

The organic additive with a polymer structure is preferably selected from polyolefin fibres such as polypropylene fibres, high-density polyethylenes (HDPEs), aramids, and technical glass fibres coated with silicone or with an organic polymer of polyethylene type, and a mixture thereof.

When it is used, the organic additive with a polymer structure preferably represents from 0.1 to 2% by weight, and even more preferentially approximately from 0.5 to 0.8% by weight relative to the total weight of the electrically insulating composite layer, especially depending on the desired application and flexibility.

The composite layer may also comprise at least one dye, especially selected from dyes that are liquid at approximately 20° C.

When it is used, the dye preferably represents approximately from 0.1 to 0.8% by weight relative to the total weight of the electrically insulating composite layer.

The electrically insulating composite layer may also comprise a second plasticizer, identical to or different from the plasticizer for starch.

The second plasticizer may be a metal stearate, a polyethylene glycol, an ethylene glycol, a polyol such as glycerol, sorbitol, mannitol, maltitol, xylitol or an oligomer of one of these polyols, a sucrose such as glucose or fructose, a plasticizer containing amide groups, or any type of plasticizer based on modified polysaccharide(s). This second plasticizer is intended to improve the dispersion of the cementitious material within the composite layer.

When it is used, the second plasticizer preferably represents from 0.05 to 1% by weight, and even more preferentially approximately from 0.1 to 0.3% by weight relative to the total weight of the electrically insulating composite layer.

The retarder, the accelerating compound, the dispersant, the inert filler, the dye and the organic additive with a polymer structure must not adversely affect the electrical properties (e.g. fire resistance) and mechanical properties (e.g. resistance to a mechanical stress, adhesion, flexibility) of the composite layer.

The electrically insulating composite layer may also comprise water, especially originating from the process for preparing said layer as described below. The water optionally serving to dissolve or disperse the plasticizer for starch or the water used to prepare the cementitious composition may not be entirely eliminated at the end of the process. It is then in the form of molecules of water forming non-covalent bonds (i.e. van der Waals bonds) with the other compounds of the layer.

The electrically insulating composite layer preferably comprises at most approximately 30% by weight of water relative to the total weight of said layer.

The electrically insulating composite layer of the invention is preferably non-porous.

The electrically insulating composite layer of the invention is preferably an inner layer of the cable of the invention.

According to the invention, "inner layer" is intended to mean a layer which does not constitute the outermost layer of the cable. More particularly, an inner layer is a layer interposed between the elongated conductive element and an especially electrically insulating outer protective sheath, said layer being or not being in direct physical contact with the elongated conductive element.

The composite layer of the cable of the invention generally covers one or more conductors or is positioned on a sheath or inner layer of the cable; it then serves as packing.

The electrically insulating composite layer of the invention is preferably in direct physical contact with the elongated conductive element.

The cable may comprise a plurality of elongated conductive elements. The electrically insulating composite layer may then surround the plurality of elongated conductive elements of the cable.

The electrically insulating composite layer of the invention is preferably in direct physical contact with the elongated conductive elements.

The cable may comprise a plurality of electrically insulating composite layers as defined in the invention.

According to a first variant of this embodiment, the cable comprises an elongated conductive element and the plurality of composite layers surrounds said elongated conductive element.

According to a second variant of this embodiment, the cable comprises a plurality of elongated conductive elements and each of the electrically insulating composite layers individually surrounds each of the elongated conductive elements to form isolated elongated conductive elements.

According to this second variant, each of the electrically insulating composite layers of the invention is preferably in direct physical contact with each of the elongated conductive elements that it surrounds.

The elongated conductive element(s) of the cable of the invention are preferably elongated electrically conductive elements. The cable is consequently preferably an electric cable.

The cable of the invention may also comprise an especially electrically insulating outer protective sheath surrounding the composite layer(s).

The outer protective sheath is preferably produced from a halogen-free material. It may be produced conventionally from materials that retard flame propagation or that resist flame propagation. Especially if these materials do not contain halogen, reference is made to HFFR (Halogen Free Flame Retardant) sheathing.

The sheath represents the outermost layer of the cable (i.e. also referred to as exterior protective sheath).

It comprises at least one organic or inorganic polymer.

The choice of organic or inorganic polymer is non-limiting, and these are well known to those skilled in the art.

According to a preferred embodiment of the invention, the organic or inorganic polymer is selected from cross-linked and non-crosslinked polymers.

The organic or inorganic polymer may be a homopolymer or a copolymer having thermoplastic and/or elastomeric properties.

The inorganic polymers may be polyorganosiloxanes.

The organic polymers may be polyurethanes or polyolefins.

The polyolefins may be selected from ethylene and propylene polymers. By way of example of ethylene polymers, mention may be made of linear low-density polyethylene (LLDPE), low-density polyethylene (LDPE), medium-density polyethylene (MDPE), high-density polyethylene (HDPE), ethylene-vinyl acetate copolymers (EVA), ethylene-butyl acrylate copolymers (EBA), ethylene-methyl acrylate copolymers (EMA), ethylene-2-ethylhexylacrylate copolymers (2HEA), copolymers of ethylene and of alpha-olefins such as, for example, polyethylene-octenes (PEO), ethylene-propylene copolymers (EPR), ethylene-propylene terpolymers (EPT) such as, for example, ethylene-propylene-diene monomer terpolymers (EPDM) or a mixture thereof.

The polymer of the sheath is preferably an organic polymer, more preferably an ethylene polymer, and more preferably an ethylene-vinyl acetate copolymer, a linear low-density polyethylene or a mixture thereof.

The outer protective sheath may also comprise a hydrated flame-retardant mineral filler. This hydrated flame-retardant mineral filler acts mainly by the physical route by decomposing endothermically (e.g., release of water), which has the consequence of lowering the temperature of the sheath and of limiting the propagation of flames along the cable. Reference is made especially to flame retardant properties.

The hydrated flame-retardant inorganic filler may be a metal hydroxide, such as magnesium hydroxide or aluminium trihydroxide.

The outer protective sheath may also comprise an inert filler, especially selected from talc, micas, dehydrated clays and a mixture thereof.

Talc is preferred.

A second subject of the present invention is a process for manufacturing a cable in accordance with the first subject of the invention, characterized in that it comprises at least the following steps:

i) a step of preparing a composite composition comprising at least one cementitious composition, at least one starch and at least one plasticizer for starch, ii) a step of applying the composite composition obtained in step i) around at least one elongated conductive element, iii) a step of hardening the composite composition in order to form an electrically insulating composite layer as defined in the first subject of the invention.

Thus, the electrically insulating composite layer of the cable as defined above in the first subject of the invention is obtained from said composite composition as defined in the second subject of the invention.

The process in accordance with the invention is quick, simple and advantageous from an economic perspective. It makes it possible to manufacture, in relatively few steps, a cable having good fire resistance, while guaranteeing good mechanical properties, especially in terms of flexibility.

In the present invention, the term "cementitious composition" means a liquid or pasty composition making it possible to form, after hardening or setting (without a sintering step), the cementitious material as defined in the first subject of the invention. The hardening or setting may occur by polycondensation or hydration.

The cementitious composition of the invention is consequently different from a ceramic powder or composition.

The cementitious composition of step i) preferably comprises:
water,
silicon (Si),
aluminium (Al) or magnesium (Mg),
oxygen (O), and
at least one element selected from potassium (K), sodium (Na), lithium (Li), caesium (Cs) and calcium (Ca).

Aluminium (Al) is preferred.

The starch and the plasticizer for starch are as defined in the first subject of the invention.

According to a particularly preferred embodiment of the invention, the cementitious composition is a geopolymer composition, a mixture consisting of a conventional anhydrous cement and water or a mixture consisting of a magnesium silicate, an alkali metal silicate, an alkaline base and water.

The geopolymer composition may be an aluminosilicate geopolymer composition, especially corresponding to the following molar composition (I):

$$wSiO_2{:}xAl_2O_3{:}yM_2O{:}zH_2O \qquad (I)$$

in which:
M is selected from Na, K, Li, Cs and a mixture thereof,
w is a value approximately between 0.1 and 8,
x is a value approximately between 0.1 and 0.3,
y is a value approximately between 0.05 and 0.2,
z is a value approximately between 0.8 and 3,
said composition comprising approximately from 35% to 79% by weight of solids ($SiO_2$, $Al_2O_3$, $M_2O$) relative to the total weight of said composition.

The water/solids weight ratio in said geopolymer composition determines the solidification kinetics during step iii).

According to a preferred embodiment of the invention, the solids/water weight ratio varies approximately from 0.6 to 1.65 and even more preferentially approximately from 0.85 to 1.40. Such a weight ratio makes it possible to have a sufficiently fluid cementitious composition to enable the homogeneous mixing thereof with the starch during step i), and the solidification kinetics of which is sufficiently slow to enable the application of the resulting composite composition around the elongated conductive element before solidification thereof.

Step i) is preferably carried out by separately preparing a starch composition according to a step i-1) and a cementitious composition according to a step i-2) then by mixing the two compositions according to a step i-3) in order to form the composite composition.

The starch composition may be obtained according to step i-1), by mixing a starch, optionally water, and a plasticizer for starch, the starch and the plasticizer for starch being as defined in the first subject of the invention.

Water is advantageously used when the plasticizer for starch is solid at ambient temperature (20-25° C.), especially in order to enable dissolution or dispersion thereof within the composite composition.

In particular, the starch composition obtained in step i-1) comprises approximately from 21 to 58% by weight of starch and approximately from 29 to 46% by weight of plasticizer, relative to the total weight of the starch composition.

In particular, the starch composition obtained in step i-1) comprises approximately from 25 to 60% by weight of plasticizer for starch and approximately from 30 to 50% by weight of plasticizer for starch, relative to the total weight of the starch composition.

According to a first variant of the invention, the cementitious composition is a mixture consisting of a conventional anhydrous cement and water. It is therefore prepared by mixing a conventional anhydrous cement as defined in the first subject of the invention and water according to step i-2).

According to a second variant of the invention, the cementitious composition is a geopolymer composition and preferably an aluminosilicate geopolymer composition.

The preparation of a geopolymer composition is generally carried out at a high pH, especially varying from 10 to 13.

When the composition is an aluminosilicate geopolymer composition, the step i-2) preferably comprises the following sub-steps:

i-2a) a step of preparing an aqueous alkali metal silicate solution with an $SiO_2/M_2O$ mole ratio ranging approximately from 1.65 to 3.4, the concentration by weight of the alkali metal silicate in the water being able to range approximately from 35 to 90%, and i-2b) a step of mixing an aluminosilicate in powder form with an $Al_2O_3/SiO_2$ mole ratio ranging from 0.4 to 0.8 with the aqueous alkali metal silicate solution prepared in the preceding step, the concentration by weight of the aluminosilicate in the aqueous alkali metal silicate solution prepared in the preceding step being able to range approximately from 10 to 80%, and preferably approximately from 25% to 65%.

The aluminosilicate may be selected from metakaolin (i.e. calcined kaolin), fly ash, blast furnace slag, expansive clays such as bentonite, calcined clays, any type of compound comprising aluminium and silica fume, zeolites and a mixture thereof. Among these compounds, metakaolin is preferred, especially that sold by Imérys.

The aqueous alkali metal silicate solution may be prepared by mixing silicon dioxide $SiO_2$ or an alkali metal silicate with a base MOH, in which M is K or Na.

The presence of the base makes it possible to increase the pH of the cementitious composition and to improve the cohesion of the layer at the end of step iii).

The silicon dioxide $SiO_2$ may be selected from silica fume (i.e. fumed silica), quartz, and mixtures thereof.

The alkali metal silicate may be selected from sodium silicates, potassium silicates and a mixture thereof. The alkali metal silicates sold by Silmaco and by PQ Corporation are preferred.

The base MOH may be chosen from KOH, NaOH and mixtures thereof.

Step i-2a) may be carried out by dissolving the base in water, leading to a release of heat (exothermic reaction), then by adding the silica (or the alkali metal silicate). The heat released then accelerates the dissolution of the silica (or of the alkali metal silicate) during step i-2a) and of the aluminosilicate during step i-2b) and therefore the setting of the geopolymer composition.

At the end of step i-2b), the geopolymer composition has a viscosity that increases with time when it is exposed to the open air.

According to a third variant of the invention, the cementitious composition is a mixture consisting of a magnesium silicate, an alkali metal silicate, an alkaline base and water. It is therefore prepared by mixing a magnesium silicate, an alkali metal silicate, an alkaline base and water according to step i-2).

The alkaline base may be KOH or NaOH or the mixture thereof.

The presence of the base makes it possible to increase the pH of the cementitious composition and to improve the cohesion of the layer at the end of step iii).

The alkali metal silicate may be selected from sodium silicates, potassium silicates and a mixture thereof. The alkali metal silicates sold by Silmaco and by PQ Corporation are preferred.

The magnesium silicate may be talc.

The composite composition may also comprise at least one agent that delays setting of the cementitious composition and/or at least one inert filler and/or at least one dispersant and/or at least one composition that accelerates setting and/or at least one organic additive with a polymer structure and/or at least one dye and/or at least one second plasticizer, the abovementioned compounds being as defined in the first subject of the invention.

The composite composition preferably does not comprise foaming agent and/or co-blowing agent. Indeed, the electrically insulating composite layer obtained from said composite composition is a layer of solid material (i.e. having a low porosity).

Step ii) is preferably carried out by hot extrusion of said composite composition, especially at a temperature ranging approximately from 60° C. to 110° C., and preferably approximately from 70° C. to 95° C.

Step iii) of hardening is generally carried out at ambient temperature. The composite layer obtained remains flexible and cohesive over time.

The process may also comprise, after step ii) (and before step iii)), a step of applying a hermetic casing around the composite composition.

The hermetic casing is preferably applied in the direction of the length of the cable, or transversely.

Generally, the hermetic casing is a tape, especially of Alu/PET or PET/Alu/PET type, said tape preferably having a width allowing approximately 20% coverage.

Following step ii), the insulating layer is covered with a hermetic casing of Alu/PET type arranged lengthways or transversely.

The process may also comprise, before, during or after step iii), a step iv) of application of an electrically insulating sheath around the electrically insulating composite layer.

This exterior protective sheath may especially be produced by extrusion.

BRIEF DESCRIPTIONS OF THE DRAWINGS

The invention will be better understood, and further aims, details, features and advantages thereof will become more clearly apparent, during the course of the following description of particular embodiments of the invention which are given solely by way of nonlimiting illustration with reference to the attached figures.

For the sake of clarity, only those elements essential to the understanding of the invention have been represented schematically in these figures, without respecting a scale.

DETAILED DESCRIPTION

Figure 1:
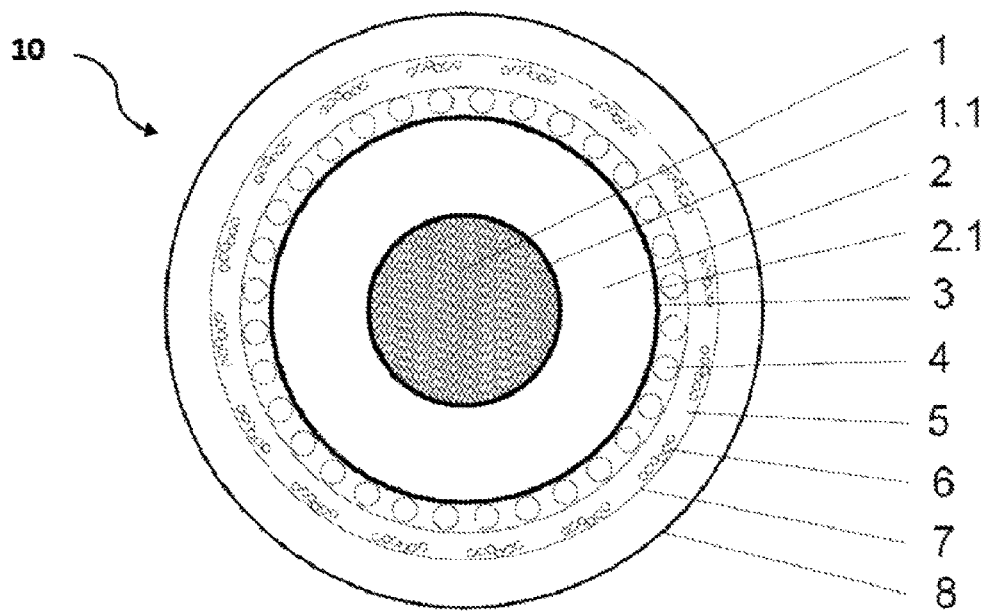
FIG. 1 is a schematic sectional view of an electric cable of the prior art, not in accordance with the invention.

The electric cable 10 illustrated in FIG. 1 corresponds to a fire-resistant medium-voltage electric cable of SHXCHX type, for marine-type applications.

This electric cable 10 comprises: a central elongated electrically conductive element 1 and, successively and coaxially around this central conductive element 1, an inner semiconducting shield 1.1, an electrically insulating layer 2 (e.g. made of ethylene elastomer and crosslinked propylene, EPR), an outer semiconducting shield 2.1, a semiconducting tape layer 3, a metal braid 4 (e.g. consisting of tin-plated copper threads with a circular section), an inner sheath comprising a polyester tape 5 and tin-plated copper threads 6, a polyester tape 7 and an outer sheath 8 (e.g. made of elastomer).

Figure 2:
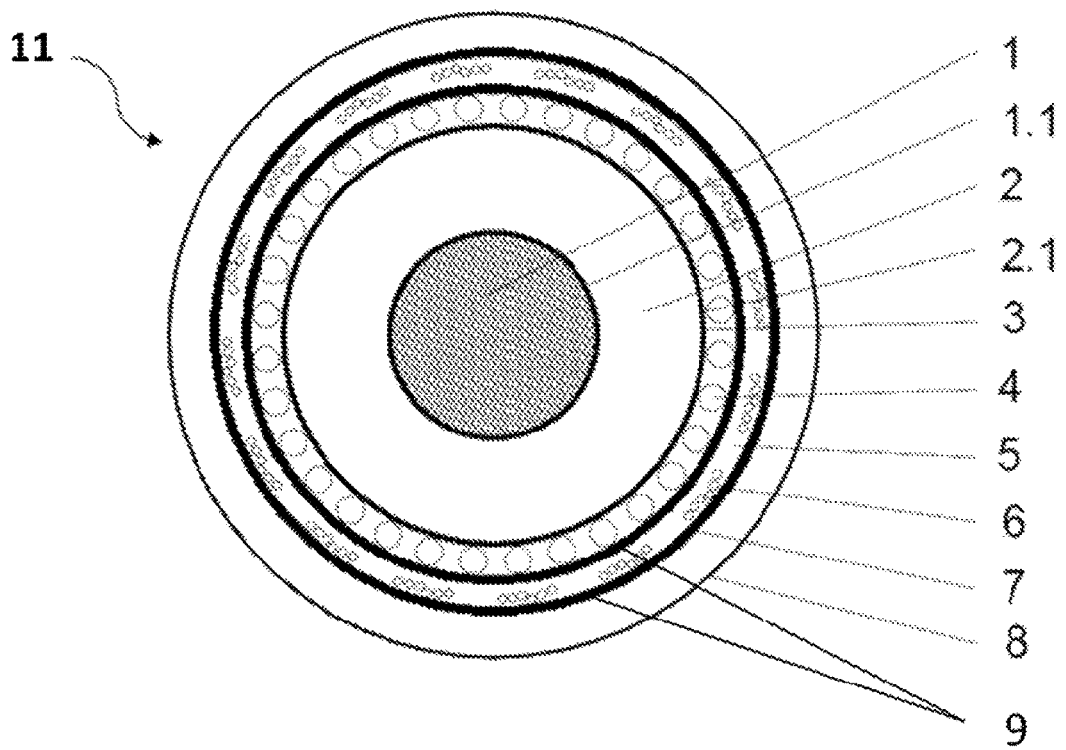
FIG. 2 is a schematic sectional view of an electric cable according to an embodiment of the present invention.

The electric cable 11 illustrated in FIG. 2 corresponds to an electric cable with a similar structure to the cable of FIG. 1, but into which two electrically insulating composite layers as defined in the invention have been incorporated.

This electric cable 11 comprises: a central elongated electrically conductive element 1 and, successively and coaxially around this central conductive element 1, an inner semiconducting shield 1.1, an electrically insulating layer 2 (e.g. made of ethylene elastomer and crosslinked propylene, EPR), an outer semiconducting shield 2.1, a semiconducting tape layer 3, a metal braid 4 (e.g. consisting of tin-plated copper threads with a circular section), an electrically insulating composite layer 9 as defined in the invention, an inner sheath comprising a polyester tape 5 and tin-plated copper threads 6, a polyester tape 7, an electrically insulating composite layer 9 as defined in the invention, and an outer sheath 8 (e.g. made of elastomer).

The following examples make it possible to illustrate the present invention. They do not have any limiting effect on the overall scope of the invention as presented in the claims. The ratios between the oxides are mole ratios, and the percentages indicated are percentages by weight.

EXAMPLES

The starting materials used in the examples are listed below:
aqueous sodium silicate solution at approximately 50% by weight, of waterglass type from Simalco, of formula $Na_2O.2SiO_2$ and with a $SiO_2/Na_2O$ mole ratio of approximately 2,
starch, Roquette®, Tackidex 1-735,
plasticizer, Roquette®, Neosorb™ 70/70,
mains water,
sodium hydroxide, Sigma Aldrich, of purity >85%,
aluminosilicate, PoleStar® 450R, Imerys, with an $Al_2O_3/SiO_2$ mole ratio of 41/55 (i.e. of approximately 0.745).
Unless indicated otherwise, all these starting materials were used as received from the manufacturers.

Example 1: Preparation of a Fire-Resistant Cable in Accordance with the Invention A starch composition was prepared by mixing 400 g of starch, 400 g of plasticizer and 160 g of water at ambient temperature.

An aluminosilicate geopolymer composition as cementitious composition was prepared in the following manner: an alkali metal silicate solution was prepared by mixing 360 g of an aqueous sodium silicate solution, 200 g of water and 60 g of sodium hydroxide. 300 g of aluminosilicate were then mixed with the alkali metal silicate solution.

Said aluminosilicate geopolymer composition comprised approximately 40% by weight of solids relative to the total weight of said composition.

The aluminosilicate geopolymer composition had the following molar composition of formula (I):

$$0.54SiO_2: 0.16Al_2O_3: 0.1Na_2O: 2.3H_2O \quad (I)$$

The geopolymer composition was mixed with the starch composition as described above, to form a composite composition.

The composite composition was hot-extruded around an elongated electrically conductive element made of copper with a 50 mm² cross section, using an extruder sold under the trade name FAIREX. The temperature within the extruder ranged approximately from 40° C. to 95° C.

Said cable obtained comprised an elongated electrically conductive element surrounded by an electrically insulating composite layer comprising 65% by weight of starch and of plasticizer for starch and 35% by weight of an aluminosilicate geopolymer cement as cementitious material.

The composite layer had a thickness of approximately 2.5 mm.

The composite layer of the cable in accordance with the invention was evaluated in terms of fire-resistance performance according to standards IEC 60331-11 and IEC 60331-21. The cable as obtained in example 1, and by way of comparison a cable not in accordance with the invention not comprising a composite layer of the invention (i.e. elongated electrically conductive element alone), were subjected to a voltage of 10 kV for 120 minutes at 85° C.

The results of this test are presented in table 1 below:

TABLE 1

| Cable | Voltage applied | Time before breakdown (in min) |
|---|---|---|
| Cable in accordance with the invention of example 1 | 10 kV | >120 |
| Cable not in accordance with the invention | 10 kV | 13 |

The results presented in table 1 confirm the fire resistance of the cable of the invention. Breakdown of the cable not in accordance with the invention is observed after 13 min, whereas the cable of the invention has not broken down after 120 min. Moreover, the cable of the invention can withstand a voltage of approximately 30 kV for at least 20 minutes.

Moreover, breakdown of a cable not in accordance comprising an electrically insulating layer without starch, obtained solely from the aluminosilicate geopolymer composition as described above, was observed after 37 or 47 min.

The invention claimed is:
1. Power and/or telecommunications cable comprising:
at least one elongated conductive element; and
at least one electrically insulating composite layer surrounding said elongated conductive element,
wherein the electrically insulating composite layer comprises at least one starch, at least one plasticizer for starch and at least one cementitious material, and
wherein the cementitious material represents from 10 to 50% by weight relative to the total weight of said electrically insulating composite layer.
2. Cable according to claim 1, wherein the cementitious material comprises silicon (Si), aluminium (Al) or magnesium (Mg), oxygen (O), and at least one element selected from potassium (K), sodium (Na), lithium (Li), caesium (Cs) and calcium (Ca).
3. Cable according to claim 1, wherein the cementitious material is a geopolymer cement or is derived from a mixture consisting of a conventional anhydrous cement and water or a mixture consisting of a magnesium silicate, an alkali metal silicate, an alkaline base and water.
4. Cable according claim 1, wherein the electrically insulating composite layer has a thickness ranging from 0.5 to 5 mm.
5. Cable according to claim 1, wherein the starch is a native starch or a modified starch.
6. Cable according to claim 1, wherein the plasticizer for starch is a metal stearate, a polyethylene glycol, an ethylene glycol, a polyol, a sucrose, a plasticizer containing amide groups, any type of plasticizer based on modified polysaccharide(s) or a mixture thereof.

7. Cable according to claim 1, wherein the starch and the plasticizer for starch represent from 50 to 90% by weight relative to the total weight of said electrically insulating composite layer.

8. Cable according to claim 1, wherein the electrically insulating composite layer is an inner layer of the cable.

9. Cable according to claim 1, wherein said cable also comprises an outer protective sheath surrounding the composite layer(s).

10. Process for manufacturing the cable as defined in claim 1, wherein said process comprises at least the following steps:
   i) a step of preparing a composite composition comprising the cementitious material, the starch and the plasticizer for starch,
   ii) a step of applying the composite composition obtained in step i) around the elongated conductive element,
   iii) a step of hardening the composite composition in order to form the electrically insulating composite layer.

11. Process according to claim 10, wherein the cementitious material of step i) comprises water, silicon (Si), aluminium (Al) or magnesium (Mg), oxygen (O), and at least one element selected from potassium (K), sodium (Na), lithium (Li), caesium (Cs) and calcium (Ca).

12. Process according to claim 10, wherein the cementitious material is a geopolymer composition, a mixture consisting of a conventional anhydrous cement and water or a mixture consisting of a magnesium silicate, an alkali metal silicate, an alkaline base and water.

13. Process according to claim 10, wherein step i) is carried out by separately preparing the starch according to a step i-1) and the cementitious material according to a step i-2) then by mixing the starch and cementitious material according to a step i-3) in order to form the composite composition.

14. Process according to claim 10, wherein step ii) is carried out by hot extrusion of said composite composition.

15. Power and/or telecommunications cable comprising
   at least one elongated conductive element; and
   at least one electrically insulating composite layer surrounding said elongated conductive element, and
   wherein the electrically insulating composite layer comprises at least one starch, at least one plasticizer for starch and at least one cementitious material, and
   wherein the starch and the plasticizer for starch represent from 50 to 90% by weight relative to the total weight of said electrically insulating composite layer.

16. Power and/or telecommunications cable comprising
   at least one elongated conductive element; and
   at least one electrically insulating composite layer surrounding said elongated conductive element,
   wherein the electrically insulating composite layer comprises at least one starch, at least one plasticizer for starch and at least one cementitious material,
   and wherein the cementitious material comprises silicon (Si), aluminium (Al) or magnesium (Mg), oxygen (O), and at least one element selected from potassium (K), sodium (Na), lithium (Li), caesium (Cs) and calcium (Ca).

* * * * *